May 4, 1943.                R. BECKER                    2,318,357
                              CLUTCH
                        Filed Jan. 17, 1941              2 Sheets-Sheet 1

Witness:
John H. Cave

Inventor
Rudolph Becker
By John F. Heine
Attorney

May 4, 1943.    R. BECKER    2,318,357
CLUTCH
Filed Jan. 17, 1941    2 Sheets-Sheet 2

Inventor
Rudolph Becker
By John F. Heine
Attorney

Witness:
John H. Cave

Patented May 4, 1943

2,318,357

UNITED STATES PATENT OFFICE 2,318,357

CLUTCH

Rudolph Becker, North Plainfield, N. J., assignor to The Singer Manufacturing Company, Elizabeth, N. J., a corporation of New Jersey Application January 17, 1941, Serial No. 374,831

7 Claims. (Cl. 192—45.1)

This invention relates to clutches and more particularly to a one-way acting friction clutch which is of a simple and rugged construction.

An object of the present invention is the provision of a clutch that is characterized by its ability to run efficiently although wear, produced through long use, has occurred within its component parts.

A further object of this invention is to provide a friction clutch having a simple and inexpensive construction that readily lends itself to modern manufacturing methods.

The invention, both in structure and in operation, as well as additional objects thereof, will be best understood from the following description taken in conjunction with the accompanying drawings in which—

Figure 1:
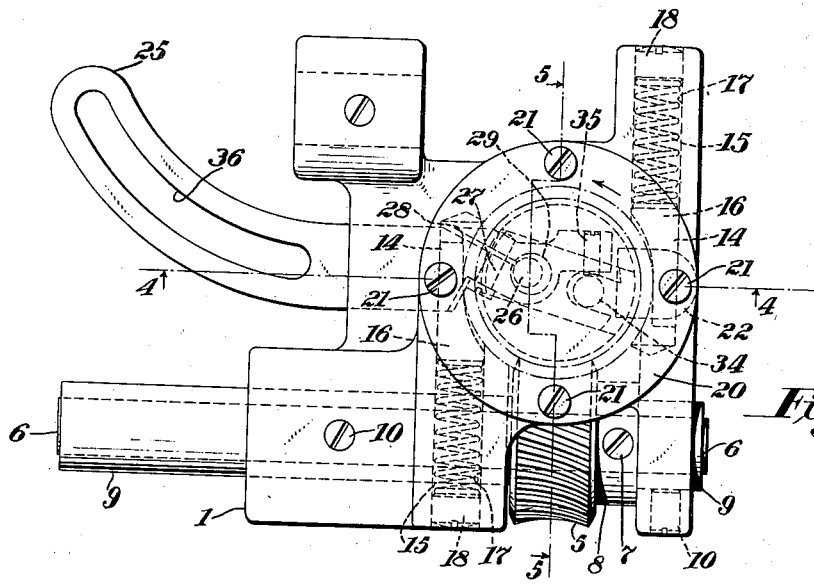
Fig. 1 is a front elevation of the present invention.
Figure 2:
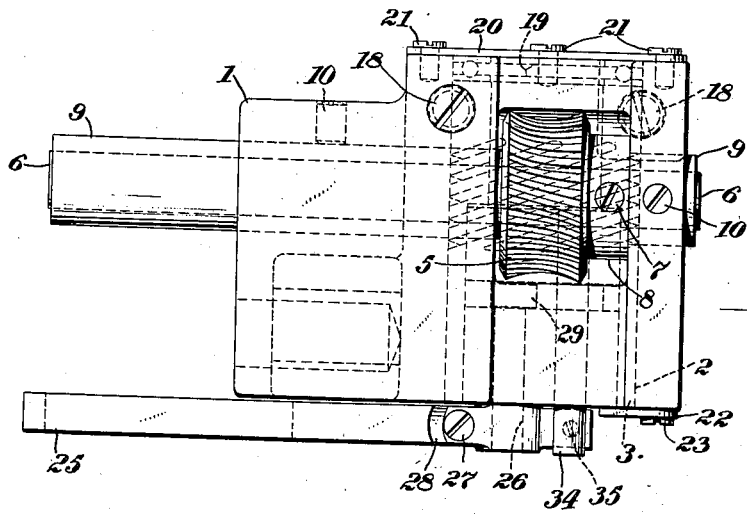
Fig. 2 is a bottom plan view of the device.
Figures 3, 5:
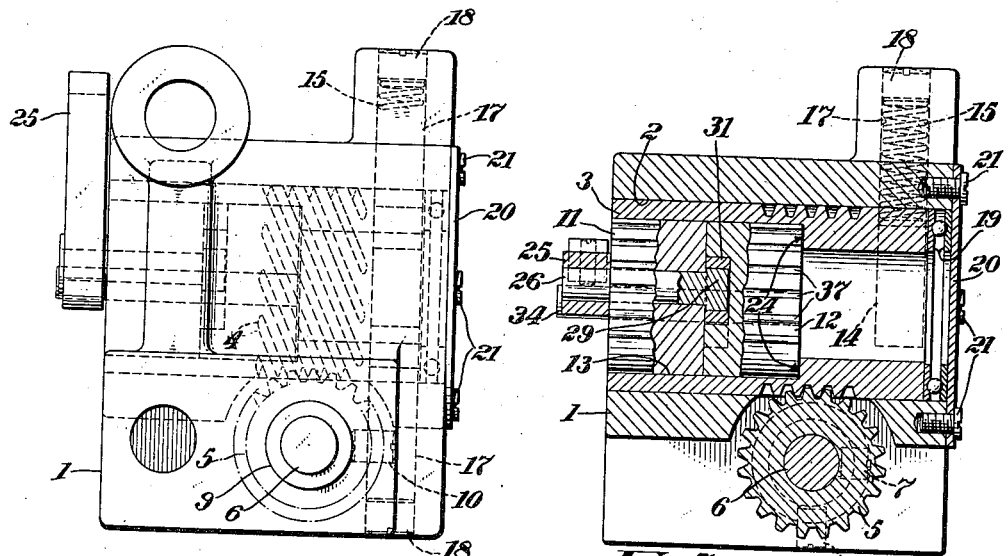
Fig. 3 is a left side elevation of the device shown in Fig. 1.
Fig. 5 is a vertical section on line 5—5 of Fig. 1.
Figure 6:
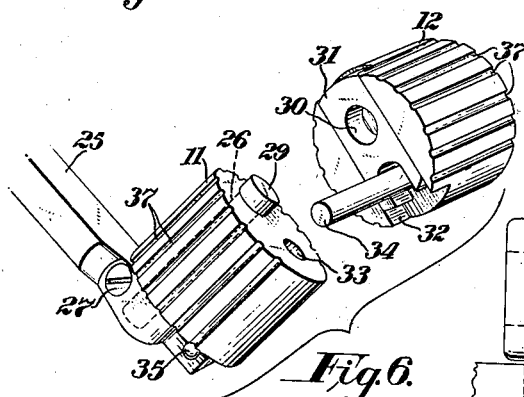
Fig. 6 is a disassembled perspective view of the clutch dogs and component elements.

Referring more specifically to the drawings, the invention comprises a frame 1 within a bore 2 of which is journaled a hollow driven shaft 3. The inner portion of shaft 3 has teeth 4 cut therein in a manner such that a worm-gear is thus formed. In mesh with the worm-teeth 4 is a pinion-gear 5 which is mounted upon a secondary driven shaft 6 by means of set-screws 7 threaded into the boss 8 extending from the pinion 5. The secondary driven shaft 6 is journaled within bearing bushings 9 which are secured in hollow portions of the frame 1 by means of set-screws 10. Thus, rotation of the primary driven shaft 3 will cause the positive rotation of the secondary driven shaft 6.

Motion is transmitted to the hollow driven shaft 3 by means of two cylindrical clutch-dogs 11 and 12 which are slidingly fitted within the hollow portion of said shaft 3. Broadly, these two cylindrical dogs 11 and 12 are adapted to intermittently dog the hollow shaft 3 by having actuating means which move the cylinders eccentrically of each other, whereby the dogs 11 and 12 grip the inner wall 13 of the hollow shaft 3 and therefore further movement of the actuating means will rotate the two dogs 11 and 12 and the shaft 3 as a unit. Upon reversing the direction of the rotation of the actuating means, the two dogs 11 and 12 will again become concentric with each other, and further movement in the reverse direction will cause them to rotate together as a concentric unit relative to the hollow shaft 3.

As indicated by an arrow in Fig. 1, shaft 3 has only one direction of rotation, and retrograde motion thereof is prevented by means of diametrically opposed wedges 14 which are biased in opposite directions against the outer surface of shaft 3 by means of coil-springs 15. The outer portions 16 of the wedges 14 are cylindrical and thus the wedges 14 are slidingly fitted into the cylindrical bores 17. The pressure exerted by springs 15 may be varied by means of adjusting screws 18 which are threaded into the bores 17.

In order to confine the driving shaft 3 in its proper position, a thrust-bearing 19 is interposed between the end-plate 20 and said shaft 3. The end-plate 20 is secured directly to frame 1 by means of screws 21. As rotation of the shaft 3 will urge the same toward the thrust-bearing 14, only a small ear 22 is provided at the opposite end of the shaft 3. This ear 22 is held in place by means of a screw 23 threaded into the frame 1 and it serves to confine both the shaft 3 and the dogs 11 and 12 within their respective bores.

The dogs 11 and 12 are slidingly fitted into the bore of the hollow shaft 3, the bore diameter of which is only slightly greater than the outside diameter of the dogs 11 and 12. These dogs are provided with longitudinal grooves 37 formed along their outer surfaces for the purpose of providing a space into which the oil, existing between the dogs and the cylindrical bore, may flow whenever said dogs are required to grip the bore surface. The bore of the hollow shaft 3 is formed with a shoulder 24 against which the inner dog 12 abuts and as above mentioned, the ear 22 bears against the face of the outer dog 11 in order to confine the dog within said bore.

The actuating means for motivating the dogs 11 and 12 comprises an actuating crank 25 mounted directly upon a stub-shaft 26 which is rotatably journaled within, and eccentrically of, the longitudinal axis of the clutch-dog 11. A screw 27, threaded into the crank 25 across the split portion 28 thereof, secures said crank 25 upon the stub-shaft 26. Upon the inner end of the stub-shaft 26 an eccentric 29 is provided which rotatably mates in an aperture 30 formed in a slide- or wear-block 31. This wear-block 31 is slidingly fitted into a slot 32 formed in one face of the inner dog 12. The purpose of this wear-block 31 is to prolong the life of both the slot 32 and the eccentric 29 by providing a relatively soft replaceable member to be positioned between the two elements.

Diametrically opposite to the stub-shaft 26, an aperture 33 is provided within said dog 11 for the purpose of receiving a similarly located pin 34 which is secured in the inner dog 12. This pin 34 provides a pivotal axis about which the dogs 11 and 12 may shift relative to each other to thereby grip the internal bore of the hollow shaft 3.

It may be understood from the above description, therefore, that a slight movement of the crank 25 will turn the eccentric head 29 of the stub-shaft 26 and thereby cramp the wear-block 31 sidewise. The wear-block 31 will in turn bear against the side shoulder of the groove 32 of the inner dog 12, thus moving the two dogs 11 and 12 eccentrically of each other about the common pivotal pin 34. This eccentric movement of the dogs 11 and 12 is limited by the inner wall 13 of the hollow shaft 3 and further movement of the crank 25 will rotate the dogs 11 and 12 and the shaft 3 as a unit.

Figure 4:
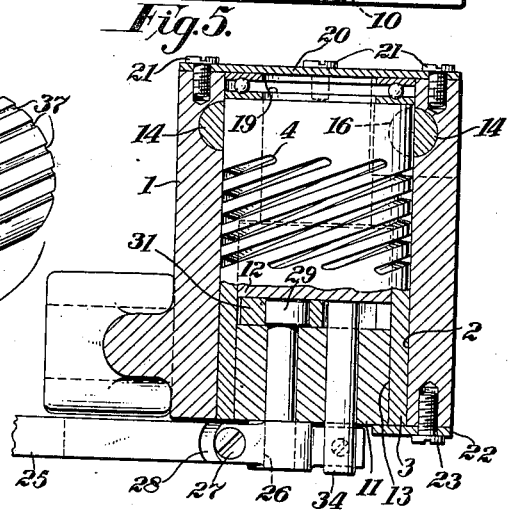
Fig. 4 is a horizontal section on line 4—4 of Fig. 1.

As best shown in Fig. 4, the pin 34 protrudes from the face of the outer dog 11 and forms a stop against which the stop-screw 35 of the crank 25 abuts when the direction of crank-rotation is reversed, whereby the two dogs 11 and 12, made concentric by this reverse crank rotation, will rotate in a reverse direction as a concentric unit relative to the shaft 3. The stop-screw 35 is threaded into the inner end of the crank 25 and it may therefore be adjusted so that the two dogs 11 and 12 may be brought into concentric relation with each other when the screw 35 engages the stop-pin 34. Furthermore, as the peripheral surfaces of the dogs 11 and 12 as well as the surface of the internal bore of shaft 3 wears away, the stop-screw 35 may be advanced so as to cause the dogs 11 and 12 to be shifted relative to each other and thereby to compensate for said wear.

As hereinabove described, the two diametrically opposed wedges 14 prevent any retrograde motion of said hollow shaft 3 and of the secondary driven shaft 6.

The free end of the crank 25 is adapted to be oscillated by a connecting-rod (not shown) or some like element and such oscillations produced therein will be transformed into an intermittent rotary movement in the driven shaft 6. As best shown in Fig. 1, the free end of the crank 25 is arcuate in shape and it is provided with an arcuately shaped slot 36 which is thus formed so that the amplitude of the crank oscillations may be varied by the usual expedient of adjusting the end of a connecting-rod along the arcuate slot 36.

Having thus set forth the nature of the invention, what I claim herein is:

1. In a clutch mechanism having a rotary member with an internal bore, intermittently rotated cylindrical dogs located in tandem relation along the longitudinal axis of and within said bore and having peripheries adapted to be shifted into engagement with the surface of said central bore, means connecting said dogs together eccentrically of their common axis of rotation and permitting relative movement between said dogs, and means to effect relative movement between said dogs about their common connecting means to thereby cause them to frictionally grip the internal bore of said rotary member and thereby drive the same.

2. A clutch mechanism having a rotary member with an internal bore, intermittently rotated cylindrical dogs located within said internal bore and having peripheries adapted to be shifted into engagement with the surfaces of the central bore, means including a pivotal pin connecting said dogs together eccentrically of their common longitudinal axis and permitting relative movement between said dogs, and means including an eccentric to effect relative movement between said dogs to cause them to frictionally grip the internal bore of said rotary member thereby to drive the same.

3. A clutch mechanism having a rotary member with an internal bore, intermittently rotated cylindrical dogs mounted in tandem relation within said bore and adapted to be shifted eccentrically of each other to engage the surface of said internal bore, a pivotal pin upon which said dogs are mounted extending parallel to and eccentrically of the common longitudinal axis thereof, a stub-shaft rotatably journaled within at least one dog and extending parallel to said pivotal pin, and an eccentric carried by said stub-shaft and adapted to be turned thereby to shift the dogs relative to each other about said pivotal pin to cause them to frictionally grip the internal bore of said rotary member thereby to drive the same.

4. In a device of the class described, a rotary member having an internal bore, a pair of intermittently rotated cylindrical dogs located in said bore and having peripheries of slightly less diameter than that of said bore, means connecting said dogs together eccentrically of their axis of rotation and permitting relative movement between said dogs, means effecting relative movement between said dogs to cause them to frictionally grip the internal bore of said rotary member whereupon further movement of said means will rotate said dogs and said rotary member as a unit, and means to prevent retrograde movement of said rotary member.

5. In a device of the class described, a frame, a rotary member having an internal bore and being journaled within said frame and adapted to rotate in but one direction, means comprising at least one wedging element carried by said frame and adapted to engage both the rotary member and said frame to thereby prevent retrograde motion of said rotary member, intermittently rotated dogs positioned in tandem relation along the longitudinal axis of and within said internal bore and having surfaces adapted to be shifted into engagement with the surface of said bore, a pivotal pin connecting said dogs together eccentrically of their common longitudinal axis, and means to effect movement between said dogs about said pivotal pin to thereby cause their surfaces to grip the surface of the internal bore of said rotary member whereupon further movement of said means will rotate said dogs and said rotary member as a unit.

6. In a clutch mechanism, a rotary member having an internal bore, a pair of rotary cylindrical dogs positioned in tandem relation within said bore, one of said dogs being provided with a slot extending across one face thereof, a pivotal pin mounted within said dogs and extending parallel to and eccentrically of the common longitudinal axis thereof, a stub-shaft rotatably journaled within one dog and extending parallel to said pivotal pin and positioned diametrically opposite to the same, an eccentric carried upon one end of said stub-shaft and being located within said slot, and means to turn said eccentric through the medium of said stub-shaft and thereby shift said dogs relative to each other about said pivotal pin so as to grip the wall of said bore and thereby drive said rotary member.

7. In a clutch mechanism, a rotary member having an internal bore, a pair of rotary cylindrical dogs positioned within said bore and arranged in tandem relation with their adjacent faces in substantial contact; one of said cylindrical dogs being provided with a slot extending diametrically across one face thereof, a wear-block slidingly fitted within said slot and provided with an aperture therein, a pivotal pin mounted within said dogs and extending parallel to and eccentrically of the common longitudinal axis thereof, a stub-shaft rotatably journaled within one dog and extending parallel to said pivotal pin and positioned diametrically opposite to the same, an eccentric carried upon one end of said stub-shaft and being rotatably mated within said wear-block aperture, and means to turn said eccentric through the medium of said stub-shaft and thereby shift said dogs relative to each other about said pivotal pn so as to grip the wall of said bore whereupon further movement of said means will rotate said dogs and said rotary member as a unit.

RUDOLPH BECKER.